United States Patent [19]
Kimura et al.

[11] Patent Number: 5,708,847
[45] Date of Patent: Jan. 13, 1998

[54] METHOD OF DIGITAL SIGNAL PROCESSING AND APPARATUS USING A REFERENCE OPERATION CYCLE INCLUDING A PROCESSING PERIOD AND A TRANSFER PERIOD

[75] Inventors: Shigeki Kimura; Takashi Suzuki, both of Shizuoka-ken, Japan

[73] Assignee: Yamaha Corporation, Hamamatsu, Japan

[21] Appl. No.: 427,247

[22] Filed: Apr. 24, 1995

[30] Foreign Application Priority Data

May 19, 1994 [JP] Japan .................. 6-129522

[51] Int. Cl.⁶ .................................. G06F 13/00
[52] U.S. Cl. .................. 395/840; 395/311; 395/826; 395/834; 395/878; 364/260; 364/262.9; 364/271.6
[58] Field of Search ................ 395/550, 842, 395/800, 325, 425, 400, 311, 840, 834, 826, 878; 364/200, 260, 262.9, 271.6; 342/194; 358/324

[56] References Cited

U.S. PATENT DOCUMENTS

| | | | |
|---|---|---|---|
| 4,112,490 | 9/1978 | Pohlman et al. | 364/200 |
| 4,635,194 | 1/1987 | Burger et al. | 364/200 |
| 4,720,780 | 1/1988 | Dolecek | 364/200 |
| 5,101,489 | 3/1992 | Sato et al. | 395/425 |
| 5,129,094 | 7/1992 | Kiuchi | 395/800 |
| 5,179,693 | 1/1993 | Kitamura et al. | 395/550 |
| 5,386,529 | 1/1995 | Kondo | 395/400 |
| 5,388,230 | 2/1995 | Yamada et al. | 395/325 |
| 5,400,148 | 3/1995 | Kashida et al. | 358/324 |
| 5,448,245 | 9/1995 | Takase | 342/194 |
| 5,487,154 | 1/1996 | Gunji | 395/842 |

*Primary Examiner*—Thomas C. Lee
*Assistant Examiner*—Ki S. Kim
*Attorney, Agent, or Firm*—Loeb & Loeb LLP

[57] ABSTRACT

A digital signal processor performs a predetermined operation on a digital signal based on data, such as coefficient parameters and programs, and outputs the processed digital signal to an external reproducing device. The digital signal is processed during a signal processing period and data is transferred and rewritten during an information transfer period. The digital signal processor generates a reference processing cycle having a period longer than the signal processing period and the information transfer period combined. The length of the signal processing period and the information transfer period are adjusted within the reference process cycle, and the signal processing and data transfer are performed in a time sharing manner via a common internal bus. When data is changed, the digital signal is outputted without being processed to an external reproducing device to maintain the continuity of the signal output. As a result, data required for the signal processing can be replaced without interrupting the output of the signal.

14 Claims, 4 Drawing Sheets

METHOD OF DIGITAL SIGNAL PROCESSING AND APPARATUS USING A REFERENCE OPERATION CYCLE INCLUDING A PROCESSING PERIOD AND A TRANSFER PERIOD

BACKGROUND OF THE INVENTION

1. Field of the Invention

The present invention relates to a digital signal processing apparatus for processing digital audio signals or digital video signals in real-time, and in accordance with more particular embodiments, to a digital signal processing method and an apparatus using the same in which programs and coefficient parameters that are required for processing the digital audio signals or digital video signals can be replaced while preserving the continuity of the signal output.

2. Description of Related Art

A typical digital signal processing apparatus for processing digital audio/video signals is equipped with an operation section and a memory section. The operation section includes filters for processing the digital audio/video signals, and the memory section stores the programs that control the processing carried out by the operation section and the coefficient parameters that are required for the processing. Single-chip DSPs (digital signal processors) for performing such operations are well known. Typically, a conventional digital signal processing apparatus has a signal processing system and a parameter transfer system. The signal processing system is coupled to external equipment and transfers digital signals between the signal processing system and the external equipment to carry out specified operations. The parameter transfer system rewrites the programs and coefficient parameters required for the specified operations that are provided by an external host apparatus. Typically, the signal processing system and the parameter transfer system are provided independently from each other.

For example, when a current specific listening or viewing environment is changed, the programs and coefficient parameters for the current specific listening or viewing environment are also changed. In this case, in accordance with conventional methods, the contents (programs and/or coefficient parameters) of the memory are replaced while the signal processing operation is temporarily stopped, or the contents of the memory may be replaced while the signal processing operation is continued.

However, if the memory contents are replaced with new data while the signal processing operation is stopped, the output of voice or image is temporarily interrupted due to the temporary stoppage of the signal processing operation. When the continuity of the output of the audio signal (voice) or the video signal (image) is important, the resulting interruption in the signal output due to the temporary interruption of the signal processing operation becomes a problem that cannot be neglected.

On the other hand, where the memory contents are replaced while the signal processing operation is continued, the memory contents are rewritten with new data when the memory is being accessed. For example, when there are conditional branches, portions of the data may not be rewritten. Since the programs and coefficient parameters are not promptly rewritten, this can cause a long lasting unstable period during which the data is rewritten. As a result, the operation becomes unstable, and filter oscillation may occur.

SUMMARY OF THE INVENTION

It is an object of embodiments of the present invention to provide a digital signal processing method and an apparatus using the same in which the programs and coefficient parameters required for processing audio or video signals are replaced while preserving the continuity of the output of the audio or video signal.

It is another object of the present invention to provided a digital signal processing method and an apparatus using the same in which a predetermined signal processing operation is performed on a digital signal based on data formed by coefficient parameters or programs that are provided from an external source. The digital signal is processed during a signal processing period, and the data is transferred and rewritten during an information transfer period.

In accordance with an embodiment of the present invention, a reference process cycle that has a period longer than the combined length of the signal processing period and the information transfer period is used. The signal processing period and the information transfer period are adjusted so that their combined length is within the reference process cycle, and the signal processing and data transfer are then performed in a time sharing manner via a common internal bus. When the data is rewritten, the unprocessed digital signal is outputted to an external reproducing device to maintain the continuity of the signal output. As a result, the data required for the signal processing can be replaced without stopping the output of the signal. Also, a digital signal processing circuit need not be physically separated between a signal processing system and an information transfer system. Accordingly, a data bus that is used for the signal processing system and a transfer bus that is used for the information transfer system can be combined to use a single common internal bus. In such a case, the wiring within the circuit is simplified.

In accordance with other embodiments of the present invention, when there is only a small amount of data to be transferred, the operation processing period is set longer. On the other hand, when there is a large amount of data to be transferred, the information transfer period is set longer. As a result, all of the data required for a specific signal processing operation is promptly replaced without reducing the overall operation speed.

Other features and advantages of the invention will be apparent from the following detailed description, taken in conjunction with the accompanying drawings which illustrate, by way of example, various features of embodiments of the invention.

DETAILED DESCRIPTION OF PREFERRED EMBODIMENTS

Figure 1:
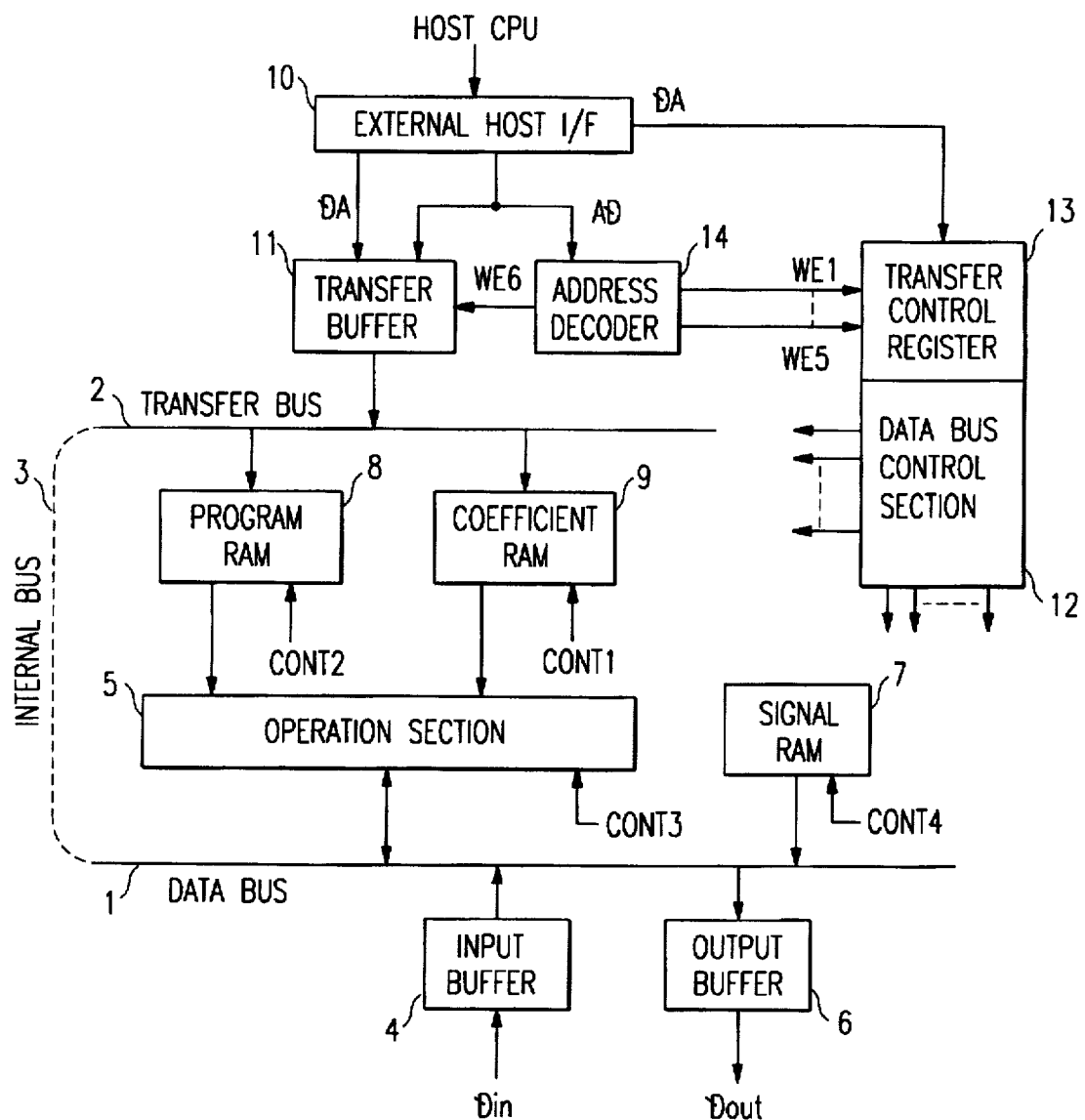
FIG. 1 illustrates a block diagram showing a configuration of a digital signal process circuit in accordance with an embodiment of the present invention.

FIG. 1 illustrates a block diagram representing a configuration of a digital signal processing circuit in accordance with an embodiment of the present invention. The digital signal processing circuit includes a data bus 1 for transferring digital audio signals, or digital video signals, that undergo a predetermined signal processing. A transfer bus 2 is provided for transferring the programs and coefficient parameters that are required for the above signal processing. In an embodiment, the data bus 1 and the transfer bus 2 may be provided independently from each other. However, according to a preferred embodiment, the transfer bus 1 and the data bus 2 are formed as a combined common internal bus 3.

A digital input signal Din is fed through an input buffer 4 to the internal bus 3. An operation section 5 performs a predetermined signal processing to the digital input signal Din and generates a digital output signal Dout. The digital output signal Dout is output through the internal bus 3 and an output buffer 6 to an external audio system or the like (not shown). A signal RAM 7 outputs audio signals or video signals of specific patterns stored therein either directly or through the output buffer 6 to outside.

The operation section 5 has digital filters that are formed from registers, adders and multipliers. The processing carried out in the operation section 5 is controlled by a program stored in a program RAM 8, and a coefficient parameter required for the operation is supplied by a coefficient RAM 9. Programs to be stored in the program RAM 8 and coefficient parameters to be stored in the coefficient RAM are fed from a host CPU (not shown) through an external host interface (I/F) 10 and a transfer buffer 11. The programs and coefficient parameters are replaced as required. In alternative embodiments, other memory devices such as ROMs, static RAMs, dynamic RAMs, or the like may be used to store the programs and coefficient parameters.

A data bus control section 12 determines which sections may use the internal bus 3 at a given time, and it also controls whether the internal bus 3 is opened within one sampling cycle as an operation period to perform a signal processing on the digital signal 1, or whether the internal bus 3 is opened as a transfer period to transfer programs or coefficient parameters. The operation period and the transfer period are adjusted to have desired lengths. Data required for the transfer and control of the programs and coefficient parameters are fed from the external host CPU through the external host I/F 10 and stored in a transfer control register 13. The data bus control section 12 performs time sharing control of the internal bus 3 with reference to the content of the transfer control register 13. An address decoder 14 generates and provides the transfer buffer 11 and the transfer control register 13 with write enable signals WE 1-6 that are used for storing data required for transfer control and for storing data to be transferred into the transfer control register 13 and the transfer buffer 11.

Figure 2:
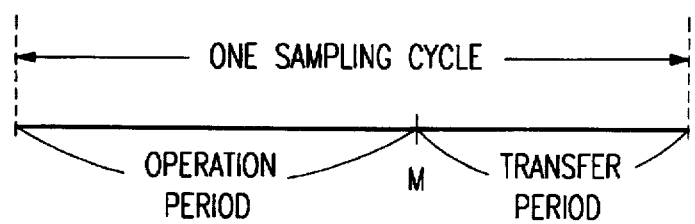
FIG. 2 shows an operation period and a transfer period determined by a data bus control section using the circuit shown in FIG 1.

FIG. 2 shows an operation period and a transfer period that are determined by the data bus control section 12 in accordance with one embodiment of the present invention.

As shown in FIG. 2, one sampling cycle defines one reference processing cycle, which is divided into the operation period and the transfer period. During the operation period, the input buffer 4, the operation section 5, the output buffer 6 and the signal RAM 7 are accessible to the internal bus 3. On the other hand, during the transfer period, the program RAM 8, the coefficient RAM 9 and the transfer buffer 11 are accessible by the internal bus 3. Both of the periods may be set to desired values, by writing their respective completion steps to the transfer control register 13 via the host I/F 10.

Figure 3:
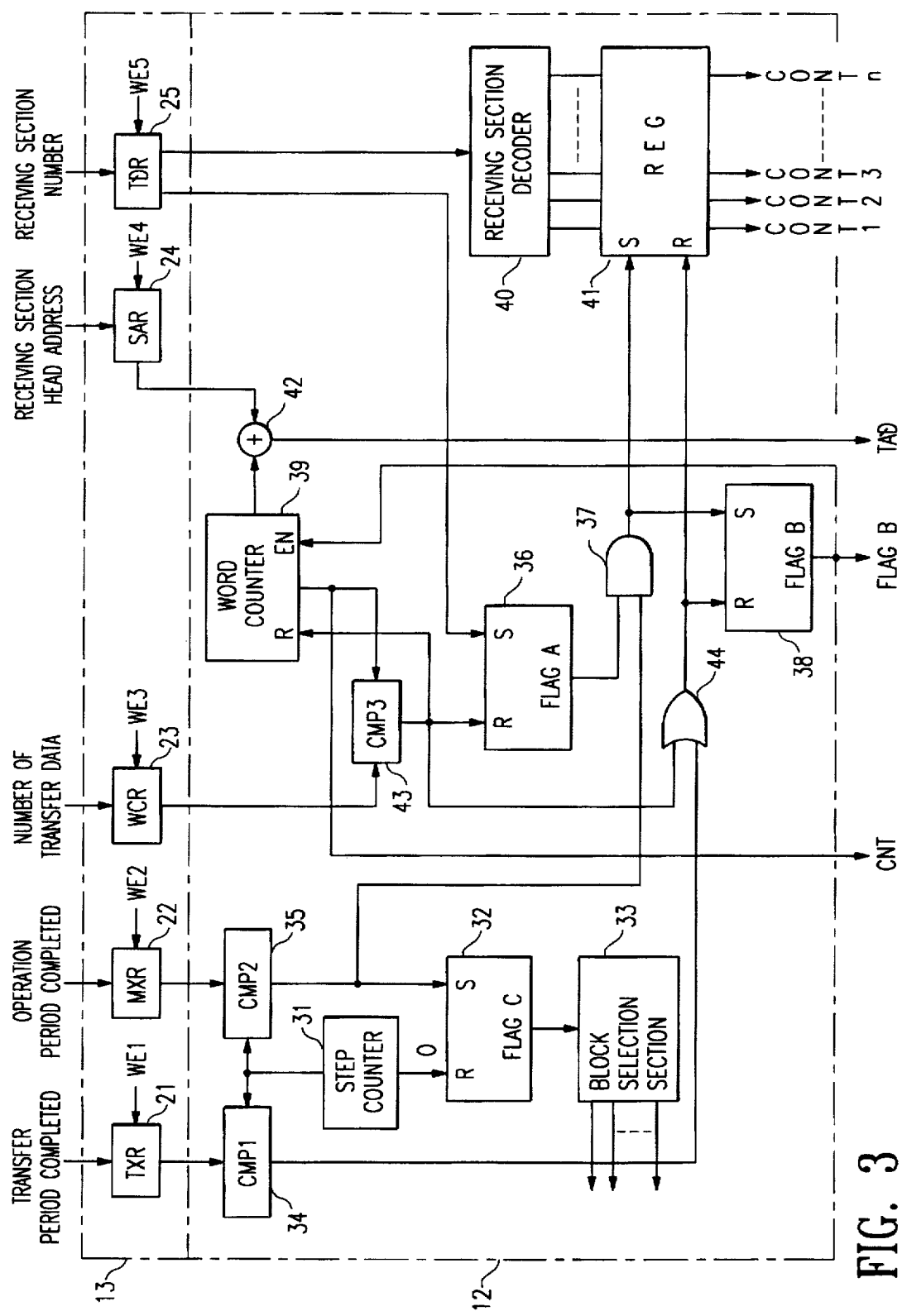
FIG. 3 illustrates a block diagram showing an example configuration of a transfer control register and a data bus control section shown in the circuit of FIG. 1.

FIG. 3 illustrates a block diagram showing a configuration example of the transfer control register 13 and the data bus control section 12 that enable transfer control as described above.

The transfer control register 13 has, for example, five registers, namely, a TXR register 21, a MXR register 22, a WCR register 23, a SAR register 24 and a TDR register 25. Completion step for completing the transfer period is set in the TXR register 21. Completion step for completing the operation period is set in the MXR register 22. Number data representing the number of words, to be transferred is set in the WCR register 23. A head address of a receiving section into which data is transferred is set in the SAR register 24. The number of the receiving section into which data is transferred is set in the TDR register 25. This data is fed through the external host I/F 10 and successively stored in the registers 21-25 in response to the write enable signals WE 1-5 provided by the address decoder 14.

Figure 4:
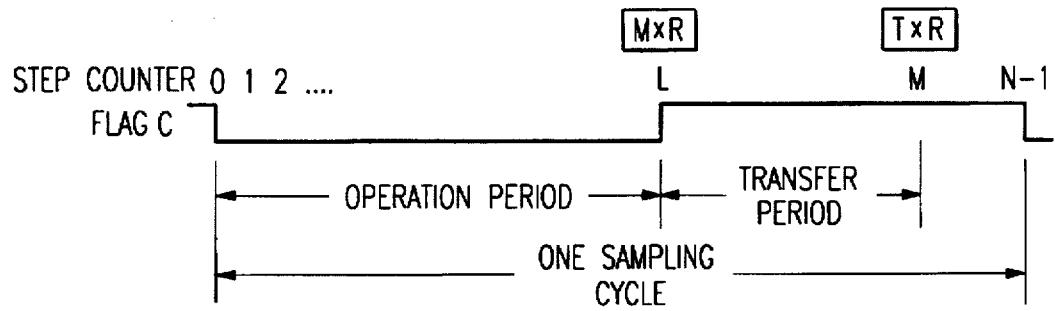
FIG. 4 shows a timing chart representing an operation period and a transfer period for one sampling cycle in the circuit shown in FIG. 1.

When data required for the data bus control is stored in the transfer control register 13, a step counter 31 starts a counting operation, and a flag C in a flag register 32 is reset. As shown in FIG. 4, when flag C is "0", a block selection section 33 selects the input buffer 4, the operation section 5 and the output buffer 6, and therefore the internal bus 3 opens for operation processing. The step counter 31 counts up at each step of the operation processing, and is reset at each sampling cycle. A counted value is compared with a value of the TXR register 21 and a value of the MXR register 22 by comparators 34 and 35, respectively. When the counted value exceeds the operation period completion step stored in the MXR register 22, the output of the comparator 35 becomes active, and flag C of the register 32 is set. A flag A of a flag register 36 is placed in a set mode (transfer waiting mode) when data is stored in the TDR register 25, and therefore the output of a gate circuit 37 becomes "1" due to the output of the comparator 35, and a flag B of a flag register 38 is set. As a result, the transfer is started.

During the transfer period, the block selection section 33 controls the output from each block to the internal bus 3. Accordingly, the program RAM 8 and the coefficient RAM 9 are selected, a word counter 39 starts a counting operation, and data is successively outputted from the transfer buffer 11 to the internal bus 3 in response to an output CNT of the word counter 39. The numbers of the receiving sections that are stored in the TDR register 25 are decoded by a receiving section decoder 40, stored as data writing signals CONT 1-n in a register 41, and fed to the respective designated receiving sections. An adder 42 adds a receiving section head address stored in the SAR register 24 and a counted value from the word counter 39 to obtain a value. Data on the internal bus 3 is stored at a receiving section address TAD designated by the value obtained by the adder 42.

When the counted value by the step counter 31 equals the value for the transfer period completion step stored in the TXR register 21, the comparator 34 becomes active. As a result, flag B and register 41 are reset via a gate circuit 44, and the transfer is completed. At this point of the processing, the word counter 39 is not reset, and still retains the number of data that has not been transferred. Also, flag A remains set and is maintained in the transfer waiting status. As a result, the remaining data will be transferred during the next period in the next sampling cycle.

When the value of the word counter 39 reaches the number of data to be transferred that is stored in the WCR register 23 during the transfer period, a comparator 43 becomes active. As a result, flag A is reset, flag B and register 41 are reset via a gate circuit 44, and the transfer operation is completed. The word counter 39 is then reset by an output of the comparator 43.

Figure 5:
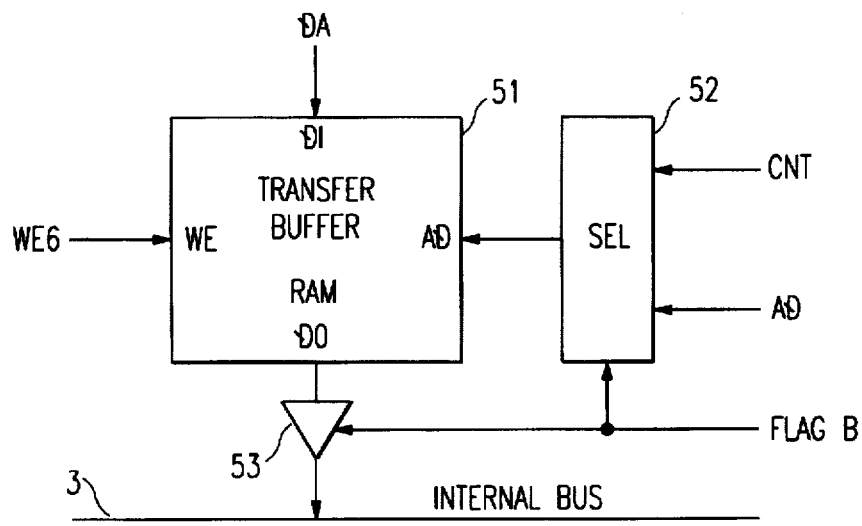
FIG. 5 illustrates a block diagram showing an example configuration of a transfer buffer shown in the circuit of FIG. 1.

FIG. 5 illustrates a block diagram of a configuration example of the transfer buffer 11. The transfer buffer 11 is used for two different operations, a data writing operation and a data transfer operation. In the data writing operation, a selection circuit 52 selects a write address AD that is fed from outside via the external host I/F, and data DA to be transferred is stored in a transfer buffer RAM 51 in response to the write enable signal WE 6. In the data transfer status, the flag B opens a gate circuit 53, and the selection circuit 52 is switched so that an output CNT of the word counter 39 is provided as a read address.

Figure 6:
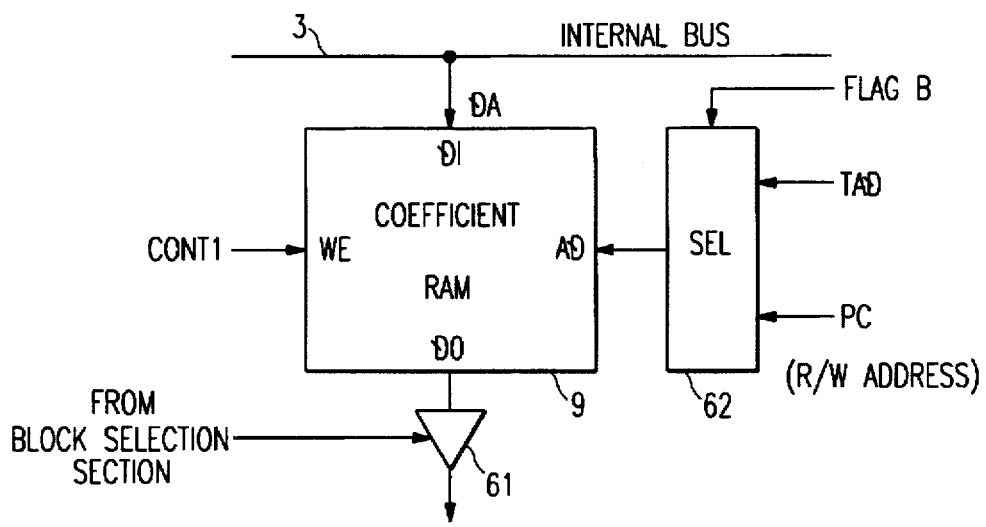
FIG. 6 illustrates a block diagram showing an example configuration about a coefficient RAM shown the circuit of FIG. 1.

FIG. 6 illustrates a block diagram of a configuration example of the coefficient RAM 9. During the operation period, a selection circuit 62 is switched so that an output PC (or a read/write address R/W) of the program counter is provided to the coefficient RAM 9 as a read address. During the transfer period, the selection circuit 62 is switched by the flag B so that a receiving section address TAD is provided to the coefficient RAM 9 as a write address. When CONT 1 is provided, a coefficient data is written in the designated write address.

Figure 7A:
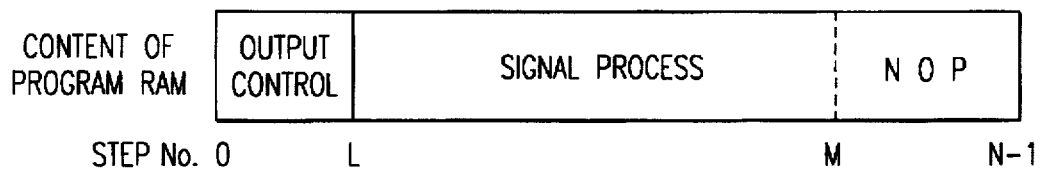
FIGS. 7(a)-(c) illustrate examples of signal processing and transfer operation using the circuit shown in FIG. 1.

FIG. 7 shows an example of the operation achieved by the use of the above circuit. A program stored in the program RAM 8 is composed of N number of steps, starting from step 0 through step N−1 as shown in FIG. 7. The program is performed at each sampling cycle. In preferred embodiments, the program is composed of an output control program having steps 0–L, a signal processing (operation) program having steps L–M, and a non-performed portion having steps M–(N−1).

Figure 8:
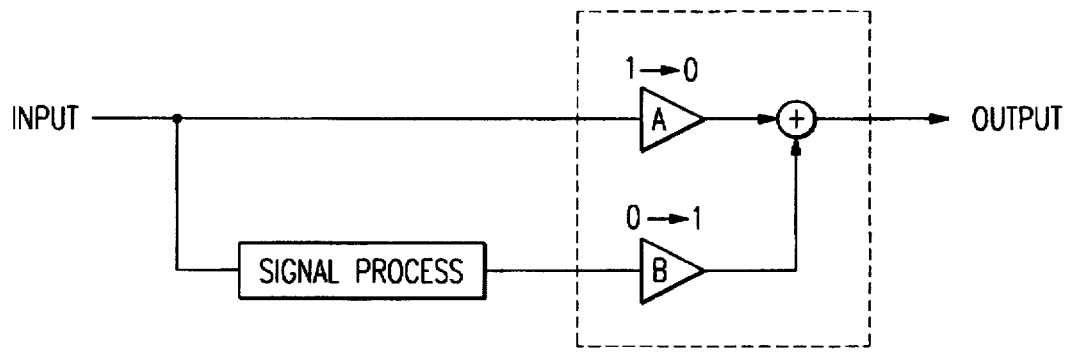
FIG. 8 illustrates a block diagram showing a configuration of an operation section having a through mode and an operation mode in the circuit shown in FIG. 1.

The output control programs, at the leading portion of the program, performs a process for selecting an operation mode and a pass through mode. In the operation mode, the signal processing is performed by the operation section 5 and a processed digital signal is outputted. In the pass through mode, an inputted digital signal is outputted without being processed. The output control program contains several steps. These modes are selected by the values of the coefficients A and B. In a preferred embodiment, the operation section 5 has the blocks shown in FIG. 8, in which a section surrounded by a broken line is controlled by the output control program. When coefficient A is "0" and coefficient B is "1", the operation mode is set. When the coefficient A is "1" and the coefficient B is "0", the pass through mode is set.

Figure 7B:

When the contents of the program RAM 8 are to be replaced, the pass through mode is used. As shown in FIG. 7(b), the end step of the operation period is set at the end step L of the output control program. As a result, a longer transfer period is obtained within one sampling cycle so that replacement of the entire program can be completed. While the program is being replaced, the pass through mode is maintained, and therefore the digital signal is continuously outputted without being interrupted.

Figure 7C:
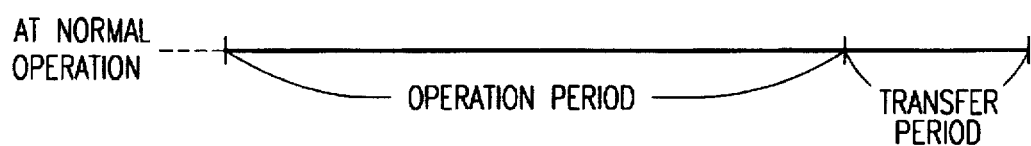

After the transfer of the program is completed, the content of transfer control register 13 is changed so that the end step of the operation period now occurs at the end step M of the signal processing program, as shown in the FIG. 7(c). The coefficients A and B of the output control program are set at "0" and "1", respectively so that the operation mode is set. As a result, an ample operation period is now obtained in one sampling cycle.

For example, in case coefficients for a single stage of a secondary IIR filter in the signal processing program are changed, only five parameters are transferred. Therefore, only a relatively short transfer period, such as for example shown in FIG. 7(c), is needed. Accordingly, a relatively long period of time can be used for signal processing. In typical coefficient changes, the coefficient is immediately used in the next sampling cycle, and therefore a stable operation is acquire.

As described above, in accordance with the present invention, a reference digital signal processing cycle is defined to have a time period longer than an operation period and an information transfer period combined. In other words, the operation period and the transfer period are provided within the reference digital signal processing cycle, and the digital signal processing operation and the information transfer operation are carried out in a time-sharing manner. As a result, the continuity of the signal output is maintained, and the replacement of programs and coefficient parameters is promptly executed, which provides a stable operation.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A method of digital signal processing for carrying out a predetermined operation on a digital signal and outputting the same, and for rewriting information required for the predetermined operation, the method comprising the steps of:

setting a reference operation cycle having a period longer than one operation cycle of the predetermined operation;

forming within the reference operation cycle a variable processing period of variable length for processing the digital signal and an information transfer period for rewriting information required for the predetermined operation;

storing a processing period completion value representing a number of steps required to process the digital signal;

counting a number of steps performed during the variable processing period;

comparing the processing period completion value with the counted number of steps performed during the variable processing period;

switching the variable processing period with the information transfer period when the counted number of steps performed during the variable processing period exceeds the processing period completion value; and varying a length of the variable processing period and a length of the information transfer period within the reference operation cycle, by changing the stored processing period completion value, for rewriting information without interrupting the outputting of the digital signal, wherein the length of the information transfer period is varied to maximize a transfer time of information required for the predetermined operation, and wherein the variable processing period is varied so that the variable processing period and the information transfer period fit within the reference operation cycle.

2. A method of digital signal processing as defined in claim 1, wherein the predetermined operation in the processing period and the information transfer period use a common internal bus that is switched between the processing period and the information transfer period.

3. A method of digital signal processing as defined in claim 2, wherein the length of the processing period and the length of the information transfer period are varied depending upon the quantity of information to be rewritten.

4. A method of digital signal processing as defined in claim 1, further including the steps of:
using a signal processing mode for processing the digital signal and outputting the processed digital signal to a reproducing device: and
using a pass through mode for outputting the digital signal without processing the digital signal to the reproducing device.

5. A method of digital signal processing for carrying out a predetermined operation on a digital signal and outputting the same, and for rewriting information required for the predetermined operation, the method comprising the steps of:
setting a reference operation cycle having a period longer than one operation cycle of the predetermined operation;
forming within the reference operation cycle a processing period for processing the digital signal and an information transfer period for rewriting information required for the predetermined operation;
varying a length of the processing period and a length of the information transfer period within the reference operation cycle for rewriting information without interrupting the outputting of the digital signal;
using a signal processing mode for processing the digital signal and outputting the processed digital signal to a reproducing device: and
using a pass through mode for outputting the digital signal without processing the digital signal to the reproducing device,
wherein the pass through mode is used when information required for processing the digital signal is changed so that the digital signal is outputted to the reproducing device without being processed while the required information is transferred.

6. A digital signal processor apparatus having a processor that carries out a predetermined operation on a digital signal and outputs the same, a memory device for storing information required for the predetermined operation to be carried out by the processor, and rewriting information stored in the memory device, the digital signal processor apparatus comprising:
a period setting circuit for generating a reference operation cycle having a period longer than one operation cycle of the predetermined operation, wherein the predetermined operation includes a variable processing period of variable length for processing the digital signal by the processor and an information transfer period for transferring information to the memory device that is required for the predetermined operation;
a storage circuit that stores a processing period completion value representing a number of steps required to process the digital signal;
a counter circuit that counts a number of steps performed during the variable processing period;
a comparator circuit that compares the processing period completion value with the counted number of steps performed during the variable processing period;
a switching circuit that switches the variable processing period with the information transfer period when the counted number of steps performed during the variable processing period exceeds the processing period completion value; and
a period altering circuit for varying a length of the variable processing period and a length of the information transfer period within the reference operation cycle, by changing the stored processing period completion value, for rewriting information without interrupting the outputting of the digital signal, wherein the length of the information transfer period is varied to maximize a transfer time of information required for the predetermined operation, and wherein the variable processing period is varied so that the variable processing period and the information transfer period fit within the reference operation cycle.

7. A digital signal processor apparatus as defined in claim 6, further including:
an input/output circuit for externally inputting and outputting the digital signal;
a transfer buffer for temporarily storing information required for the predetermined operation that is externally provided; and
a common bus for alternatingly transferring the digital signal between the input/output circuit and the processor device and for transferring the information from the transfer buffer to the memory device.

8. A digital signal processor apparatus as defined in claim 6, wherein the processing period and the information transfer period are externally adjustable.

9. A digital signal processor apparatus as defined in claim 6, further including a switching circuit for selecting either a signal processing mode for processing a digital signal and outputting the processed digital signal to a reproducing device or a pass through mode for outputting the digital signal without processing the digital signal to the reproducing device.

10. A digital signal processor apparatus having a processor that carries out a predetermined operation on a digital signal and outputs the same, a memory device for storing information required for the predetermined operation to be carried out by the processor, and rewriting information stored in the memory device, the digital signal processor apparatus comprising:
a period setting circuit for generating a reference operation cycle having a period longer than one operation cycle of the predetermined operation, wherein the predetermined operation includes a processing period for processing the digital signal by the processor and an information transfer period for transferring information to the memory device that is required for the predetermined operation;
a period altering circuit for varying a length of the processing period and a length of the information transfer period within the reference operation cycle for rewriting information without interrupting the outputting of the digital signal; and a switching circuit for selecting either a signal processing mode for processing a digital signal and outputting the processed digital signal to a reproducing device or a pass through mode for outputting the digital signal without processing the digital signal to the reproducing device, wherein the pass through mode is used when information required for processing the digital signal is changed so that the digital signal is outputted without being processed to the reproducing device while the required information is being transferred.

11. A digital signal processor apparatus comprising:

a processor that carries out a predetermined operation on a digital signal;

a memory device for storing information required for the predetermined operation to be carried out by the processor, and rewriting information stored in the memory device, the memory device also storing a completion value representing the number of steps required to process the digital signal;

a counter circuit that counts a number of steps performed while processing the digital signal;

a comparator circuit that compares the completion value with the counted number of steps performed while processing the digital signal; and a switching circuit for selecting either a signal processing mode for processing the digital signal and outputting the processed digital signal to a reproducing device or a pass through mode for outputting the digital signal without processing the digital signal to the reproducing device while the required information is being transferred to the memory device, wherein the switching circuit switches the processing mode with the pass through mode when the counted number of steps performed while processing the digital signal exceeds the completion value.

12. A digital signal processor apparatus as defined in claim 11, further including a period setting circuit for generating a reference operation cycle having a period longer than one operation cycle of the predetermined operation, wherein the predetermined operation includes a processing period for processing the digital signal by the processor and an information transfer period for transferring information to the memory device that is required for the predetermined operation.

13. A digital signal processor apparatus comprising:

a processor that carries out a predetermined operation on a digital signal;

a memory device for storing information required for the predetermined operation to be carried out by the processor, and rewriting information stored in the memory device;

a switching circuit for selecting either a signal processing mode for processing the digital signal and outputting the processed digital signal to a reproducing device or a pass through mode for outputting the digital signal without processing the digital signal to the reproducing device while the required information is being transferred to the memory device; a period setting circuit for generating a reference operation cycle having a period longer than one operation cycle of the predetermined operation, wherein the predetermined operation includes a processing period for processing the digital signal by the processor and an information transfer period for transferring information to the memory device that is required for the predetermined operation; and a period altering circuit for varying a length of the processing period and a length of the information transfer period within the reference operation cycle for rewriting information.

14. A digital signal processor apparatus as defined in claim 11, further including:

an input/output circuit for externally inputting and outputting the digital signal;

a transfer buffer for temporarily storing information required for the predetermined operation that is externally provided; and a common bus for alternatingly transferring the digital signal between the input/output circuit and the processor device and for transferring the information from the transfer buffer to the memory device.

* * * * *